US012545861B2

(12) United States Patent
Lilly

(10) Patent No.: US 12,545,861 B2
(45) **Date of Patent: *Feb. 10, 2026**

(54) METHOD AND COMPOSITION

(71) Applicant: For Spills Ltd., Edinburgh (GB)

(72) Inventor: David Lilly, Edinburgh (GB)

(73) Assignee: FOR SPILLS LTD., Edinburgh (GB)

(*) Notice: Subject to any disclaimer, the term of this patent is extended or adjusted under 35 U.S.C. 154(b) by 724 days.

This patent is subject to a terminal disclaimer.

(21) Appl. No.: 17/291,941

(22) PCT Filed: Nov. 8, 2019

(86) PCT No.: PCT/GB2019/053159

§ 371 (c)(1),
(2) Date: May 6, 2021

(87) PCT Pub. No.: WO2020/095055

PCT Pub. Date: May 14, 2020

(65) Prior Publication Data

US 2022/0010241 A1 Jan. 13, 2022

(30) Foreign Application Priority Data

Nov. 9, 2018 (GB) ..................................... 1818328

(51) Int. Cl.
*C11D 7/20* (2006.01)
*B08B 1/12* (2024.01)
(Continued)

(52) U.S. Cl.
CPC .................. *C11D 7/20* (2013.01); *B08B 1/12* (2024.01); *C11D 17/06* (2013.01); *C11D 2111/14* (2024.01)

(58) Field of Classification Search
CPC ....... C11D 7/20; C11D 11/0023; C11D 17/06; B08B 1/12; B08B 3/04
See application file for complete search history.

(56) References Cited

U.S. PATENT DOCUMENTS 3,382,170 A 5/1968 Hans
3,673,095 A * 6/1972 Archer ................ C11D 3/1293
510/462

(Continued)

FOREIGN PATENT DOCUMENTS

CN 101703072 5/2010
CN 102399653 A 4/2012

(Continued)

OTHER PUBLICATIONS

"Freshbin disinfectant powder", MINTEL, retrieved from www.gnpd.com, 3 pages.

(Continued)

*Primary Examiner* — Brian P Mruk
(74) *Attorney, Agent, or Firm* — SNELL & WILMER L.L.P.

(57) ABSTRACT

A method for removing grease, oil or fat from a floor comprises applying expanded perlite particles in dry form to the floor and brushing said perlite across the affected area to strip or scour the grease, oil or fat, without applying water. The particle size of the perlite may be small, for example it may be the case that at least 90% by weight of the perlite has a particle size of less than 700 microns or less than 200 microns.

11 Claims, 1 Drawing Sheet

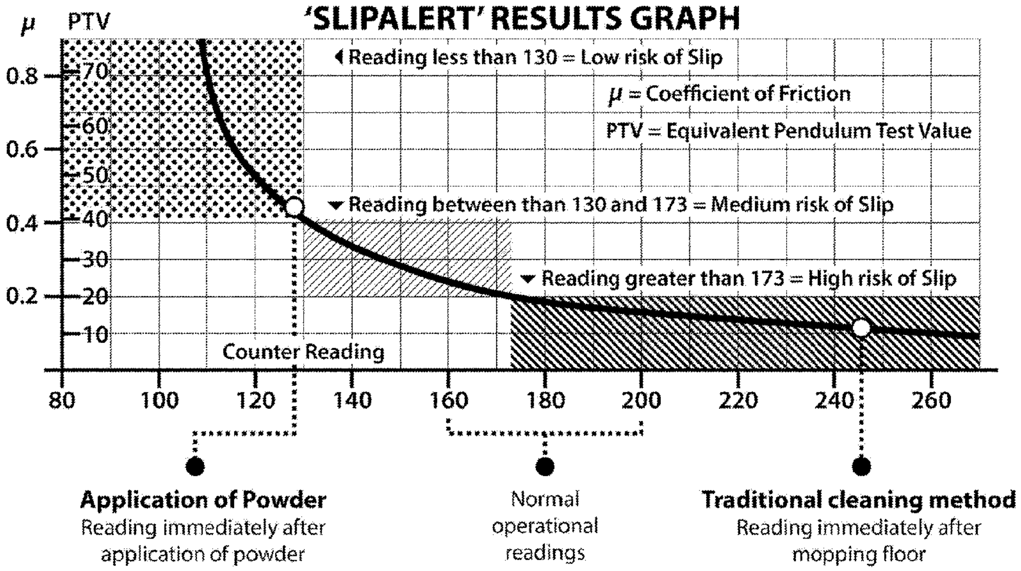

(51) Int. Cl.
*B08B 3/04* (2006.01)
*C11D 17/06* (2006.01)

(56) References Cited

U.S. PATENT DOCUMENTS

| | | | |
|---|---|---|---|
| 3,985,668 A | 10/1976 | Hartman | |
| 4,051,056 A | 9/1977 | Hartman | |
| 4,309,247 A | 1/1982 | Hou et al. | |
| 4,607,594 A | 8/1986 | Thacker | |
| 5,603,896 A | 2/1997 | Rollen | |
| 5,696,236 A | 12/1997 | Omar et al. | |
| 6,083,408 A | 7/2000 | Breitenbach et al. | |
| 6,232,521 B1 | 5/2001 | Bewick-Sonntag et al. | |
| 6,407,212 B1 | 6/2002 | Morgenthaler et al. | |
| 8,226,776 B1 | 7/2012 | Welch et al. | |
| 12,213,480 B2 * | 2/2025 | Lilly | A01N 43/50 |
| 2005/0056229 A1 | 3/2005 | Greene et al. | |
| 2007/0065475 A1 | 3/2007 | Elfersy | |
| 2009/0211981 A1 * | 8/2009 | Russo | C11D 7/20 210/660 |
| 2014/0230738 A1 | 8/2014 | Goff | |
| 2014/0230739 A1 | 8/2014 | Goff | |
| 2014/0319059 A1 | 10/2014 | Unhoch | |
| 2016/0000291 A1 | 1/2016 | Calderas et al. | |
| 2016/0046826 A1 | 2/2016 | Adam et al. | |
| 2016/0058008 A1 | 3/2016 | Cao et al. | |
| 2017/0267560 A1 | 9/2017 | Coronas Ceresuela et al. | |

FOREIGN PATENT DOCUMENTS

| | | | |
|---|---|---|---|
| CN | 105246852 A | 1/2016 | |
| CN | 105925401 A | 9/2016 | |
| DE | 2730266 | 1/1979 | |
| EP | 0281575 A1 | 9/1988 | |
| FR | 1479545 A | 5/1967 | |
| FR | 2283653 A1 | 4/1976 | |
| GB | 2043734 | 10/1980 | |
| GB | 2257053 | 6/1993 | |
| JP | H04287626 | 10/1992 | |
| JP | H06343362 | 12/1994 | |
| JP | H07203793 | 8/1995 | |
| JP | H0853301 | 2/1996 | |
| JP | H08259413 | 10/1996 | |
| JP | 2001072519 | 3/2001 | |
| JP | 2002212927 * | 7/2002 | E01H 1/04 |
| JP | 2011056143 | 3/2011 | |
| JP | 2014226664 | 12/2014 | |
| KR | 20160024237 | 3/2016 | |
| WO | 9307747 | 4/1993 | |
| WO | 9421775 | 9/1994 | |
| WO | 9501724 | 1/1995 | |
| WO | 9711147 | 3/1997 | |
| WO | 9724092 | 7/1997 | |
| WO | 9858533 | 12/1998 | |
| WO | 2005120221 | 12/2005 | |
| WO | 2006084161 | 8/2006 | |
| WO | 2007043343 | 4/2007 | |
| WO | 2015047279 | 4/2015 | |
| WO | 2015127528 | 9/2015 | |
| WO | 2017151741 | 9/2017 | |
| WO | 2018048947 | 3/2018 | |
| WO | WO 2018/114100 * | 6/2018 | C11D 3/12 |
| WO | WO-2018114100 A1 * | 6/2018 | C11D 3/12 |

OTHER PUBLICATIONS

Chinese Search Report, for Application No. 2019800715630, mailed Feb. 14, 2023.

Chinese Search Report, for Application No. 2019800782372, mailed Dec. 16, 2021.

JPOA, Japanese Office Action dated Sep. 5, 2023 in Application No. 2021-530203.

JPO; Japanese Notice of Reasons for Refusal dated Jan. 9, 2024 in Japanese Application No. 2021525149.

EPO; European Search Report dated May 24, 2024 in Application No. 19820844.9.

EPO, European Examination Report dated Apr. 22, 2025 in EP Application No. 19820844.9.

Bastani et al., "Study of oil sorption by expanded perlite at 298. 15K", Separation and Purification Technology, Elsevier Science, Amsterdam, NL, vol. 52, No. 2, Dec. 1, 2006, https://doi.org/10.1016/j.seppur.2006.05.004. pp. 295-300.

Teas et al: "Investigation of the effectiveness of absorbent materials in oil spills clean up", Desalination, Elsevier, Amsterdam, NL, vol. 140, No. 3, Nov. 20, 2001, https://doi.org/10.1016/S0011-9164(01)00375-7. pp. 259-264.

Japan Patent Office, Japanese Office Action dated Oct. 22, 2025 in Application No. 2021-525149.

"World Web Archive NDL Internet Materials Collection and Preservation Project", [online], [text], Nov. 9, 2015, [obtained on: Oct. 17, 2025], obtained from <https://web.archive.org/web/20151109205131/http://www.monotaro.com/g/00001373/>.

Yuji Nishikawa, Tamotsu Nakai, Recent Conditions and Future of Perlite Resources, Sep. 5, 1999, No. 20, vol. 5, p. 468-473.

Review of Ugel on Internet store Monotaro, [online], [text], [obtained on: Oct. 17, 2025], obtained from <https://www.monotaro.com/review/product/00001373/page-8/?sort=ranking>.

* cited by examiner

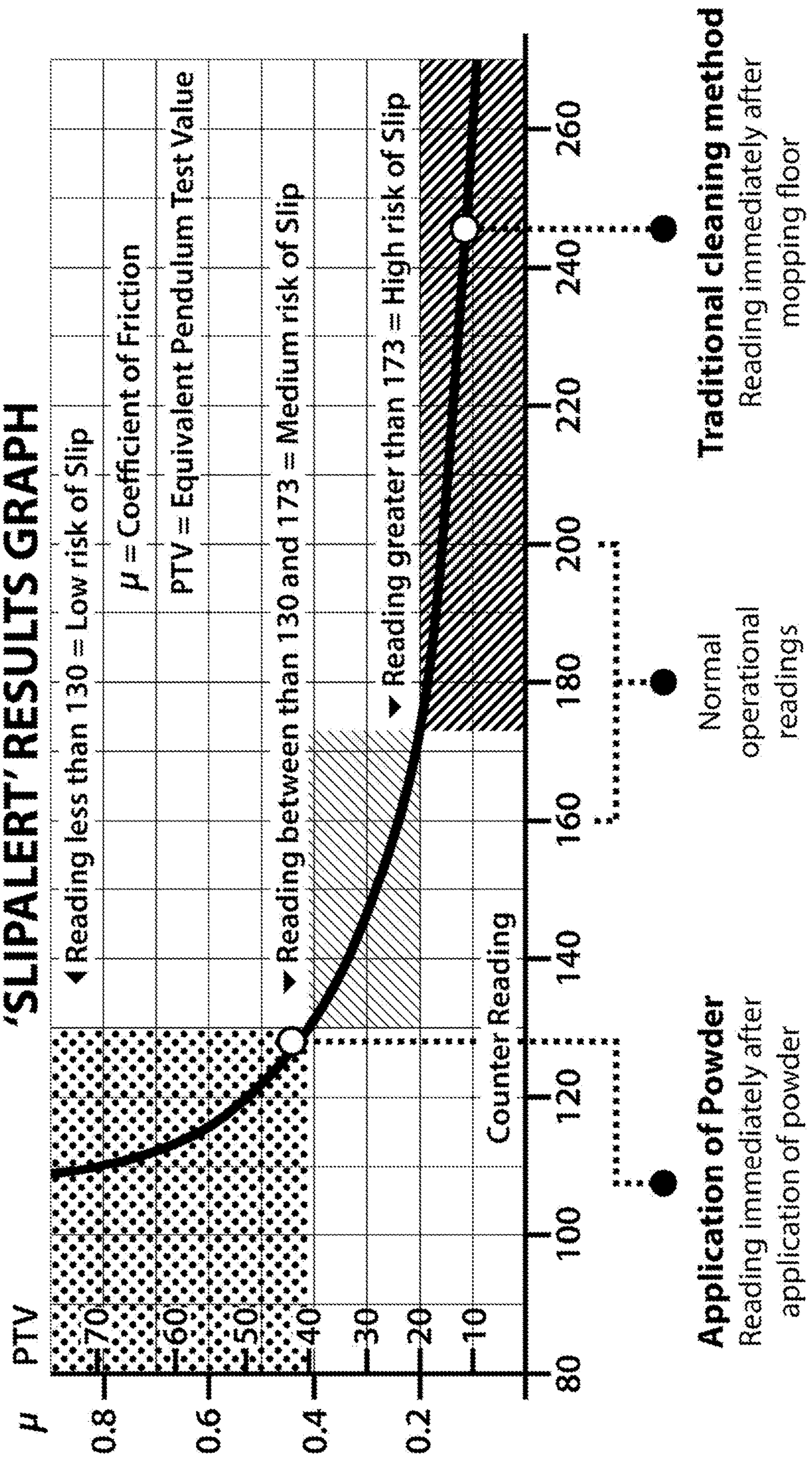
'SLIPALERT' RESULTS GRAPH
Reading less than 130 = Low risk of Slip
μ = Coefficient of Friction
PTV = Equivalent Pendulum Test Value
Reading between than 130 and 173 = Medium risk of Slip
Reading greater than 173 = High risk of Slip
μ
0.8
0.6
0.4
0.2
PTV
70
60
50
40
30
20
10
80
100
120
140
160
180
200
220
240
260
Counter Reading
Application of Powder
Reading immediately after application of powder
Normal operational readings
Traditional cleaning method
Reading immediately after mopping floor

METHOD AND COMPOSITION

FIELD OF THE INVENTION

The present invention relates to methods and compositions for removing greases or oils from surfaces, in particular floors.

BACKGROUND TO THE INVENTION

Various products and methods exist for the removal or greases, oils or fats from floors and other hard surfaces in catering, industrial or domestic settings.

Restaurant kitchens are amongst the environments in which grease can require regular removal from floors, particularly due to the use of deep fat fryers. Methods commonly used in this context include applying aqueous compositions comprising detergents to the floors. Commonly hot water is mixed with a degreasing chemical and applied with a wet mop, often repeatedly until the grease is removed. Such methods are not ideal for several reasons: the floor is rarely completely de-greased and therefore the process is inadequate; water and a degreasing chemical or detergent, such as a surfactant, are used which temporarily increases the slipperiness of the floor significantly increasing the slip risk; a mop head becomes ingrained with grease and oily substances and therefore requires washing itself after use; water is wasted and degreasing chemicals and surfactants are poured down the drain entering the waste water system and eventually inland waterways and marine habitats (surfactants are known to be environmentally harmful toxins); and finally, if this process is carried out during operating times, droplets of oil from deep fat fryers continue to fall to the floor during the cleaning process which has no lasting drying or cleaning effect on the floor, so the slip hazard continues.

It is important that grease is removed not only thoroughly but also efficiently, minimising the time required. Current methods require the fetching of a bucket, filling it with hot water, the mixing in of a surfactant or other degreaser and then repeated applications of the solution with a mop. Then it is necessary to allow a period of time for the floor to dry which is often interrupted by ongoing cooking operations which simply add further oils to the floor. The average time observed in a typical kitchen for this process is about 20 minutes.

Furthermore it is becoming increasingly important to minimise the environmental impact of methods of grease removal and also to minimise the use of certain chemicals and other resources in this context.

Water waste is becoming an increasing issue across the world but particularly in the drier regions where industry and commercial operations must find ways to reduce their water usage. The use of chemicals, such as those that degrease and clean floors, that end up in the water course has been proven to be damaging to fresh water and marine life and needs to be dramatically reduced where possible. The use of polymer mops and plastic buckets which eventually become entrenched in grease, impossible to clean and find their way to landfill sites is also polluting the world with non-degradable and harmful materials.

SUMMARY OF THE INVENTION

From a first aspect the present invention provides a method for removing grease, oil or fat from a floor comprising applying expanded perlite particles in dry form to the floor and brushing said perlite across the affected area to strip or scour the grease, oil or fat, without applying water.

Surprisingly we have found that the use of dry perlite rather than aqueous compositions can be very effective and can strip grease from floors to leave surfaces clean and dry very effectively.

The perlite used in the present invention is expanded perlite. Accordingly the term "perlite" in the context of the present invention should be understood as "expanded perlite".

Without wishing to be bound by theory the present invention is believed to be particularly effective partly because of the abrasive nature of the perlite particles. The inventor has recognised that the highly abrasive edges of perlite particles, if brushed back and forth across a greasy floor, have a high affinity for the grease and lift it off the floor to leave a relatively dry and certainly safer surface.

It is believed that this mechanism, involving the abrasive properties of perlite to strip grease, has not previously been recognised, and accordingly the present invention allows a new, effective, way, to remove grease, oil or fat from surfaces e.g. floors. It should be noted that this abrasion mechanism differs from mechanisms which may use other processes, such as absorption.

Further advantages of the present invention reside in its simplicity: perlite is the only ingredient necessary to lift the grease from the floor and accordingly the composition is cost effective to prepare and also avoids using other substances, including detergents or degreasers, which may be environmentally harmful or costly. Various prior art methods and compositions aimed at scouring or degreasing utilise perlite in aqueous compositions, or in combination with other components or in treated form, but the present inventor is the first to discover and prove that untreated perlite can be used on its own and in dry form to strip oil or grease from floors.

This is a significant step forward and of particular utility in restaurant kitchens where the efficiency and advantages provided by the present invention can translate into significant cost savings and efficiency improvements.

The perlite may be applied to one part of the floor area and brushed across the affected area. In other words the initial application does not need to cover all of the affected area because brushing the product over it will be effective.

Only a small amount or thin layer of perlite may be required to effectively remove the grease, oil and fat. For example, per $m^2$ of affected floor, the following amounts of expanded perlite may optionally be used: about 1 g to about 50 g, or optionally about 1 g to about 30 g, or optionally about 1 g to about 20 g, or optionally about 2 g to about 18 g, or optionally about 5 g to about 15 g, or optionally about 8 g to about 12 g, or optionally about 10 g. These weights of expanded perlite may optionally apply when the density of the expanded perlite is 146 kg per cubic metre. The density may differ, for example may be within the range 30 to 300 $kg/m^3$ or 30 to 200 $kg/m^3$ or 30 to 150 $kg/m^3$ or 50 to 150 $kg/m^3$ or 100 to 150 $kg/m^3$.

The brushing may be carried out with for example a soft brush head. Nevertheless, in accordance with the present invention other brushes may be used. "Brushing" herein can entail use of a brush but alternatively may entail moving or scraping the product over the floor by any means. The invention is effective at removing not only fresh material but also walked in oil or grease.

Optionally, particular particle sizes of perlite may be used. The particle sizes may be within the range of 1 micron to 700 microns, or up to 700 microns. The average particle size may be in the range of 1 micron to 700 microns, or up to 700 microns. At least 50%, or at least 75%, or at least 90%, or at least 95%, or at least 99%, of the perlite composition, by weight, may be composed of perlite particles falling with the range of 1 micron to 700 microns, or up to 700 microns.

Optionally, instead of 1 micron to 700 microns, or up to 700 microns, the range may be 1 micron to 500 microns, 10 microns to 500 microns, 10 microns to 300 microns, 10 microns to 200 microns, 10 microns to 100 microns, for example, or up to the upper ends of those ranges.

Particle size can be measured or determined by for example using a sieve of a particular mesh diameter. For example a 200 micron sieve will allow particles from 0 to 200 microns to pass through, this being one of the effective ranges of particle sizes for stripping grease from floors in accordance with the present invention.

Optionally the composition contains only expanded perlite. It is not necessary for any other component to be present. Optionally no other grease-stripping component may be present. Other materials may nevertheless optionally be present, to the extent that they do not prevent the composition from stripping grease. Other materials present may optionally be other minerals or other rock types. Optionally the purity of the material may be high, for example at least 90%, or at least 95%, or at least 99%, or at least 99.5%, or at least 99.9% perlite by weight. Other minerals or rock types in the product may be inert and may serve no purpose though may reduce the overall performance of the product application.

The invention works well without needing the perlite to be coated with any other material, e.g. such that the perlite is not coated with a surfactant, degreaser, cleaner or other agent. The perlite is able to function effectively and advantageously on its own and other added materials may adversely affect the behaviour of the perlite and may increase the cost of the product and decrease the effectiveness.

The use of product having particular particle sizes identified herein provides a further inventive point of distinction. The composition differs from previously known compositions in that the perlite particle size is much smaller. Conventionally perlite particles of less than 1 mm have been considered as merely waste materials and too fine or dusty to be useful. Various compositions have used perlite of particle sizes greater than 700 mm and up to 6 mm in the context of various applications. These include: as a filtration medium for soil to support healthy plant growth in the horticultural industry; as a bulking agent for large animal feed, as an abrasive in toothpaste; compacted and turned into insulation boarding for the cryogenic industry; as a liquid absorbent in various sectors; and as a strengthening compound in wall panelling for the construction industry.

Furthermore, the inventor has tested larger particles and has found that they do not strip grease off floors as effectively as the smaller particle size range and instead tend to roll around on the floor ineffectively.

Thus the present invention can advantageously use small perlite particles, which previously have been considered waste. This adds a further environmentally advantageous dimension. Previously others have not considered using these materials. The present inventor tested different particles sizes to determine their best applications and the smallest particles demonstrated a particularly effective use in stripping grease. This addresses the long standing and unresolved problem of greasy kitchen floors.

Previously some companies have utilised some types of perlite particles for their absorbency, which has led them to use larger particle sizes. This has taught away from the present invention which uses expanded perlite for grease stripping by abrasion, and preferably uses small particle sizes (optionally up to 700 microns, or optionally up to 500 microns, or optionally up to 300 microns, or optionally up to 200 microns, or optionally up to 100 microns, for example). Without wishing to be bound by theory, the smaller particle sizes are believed to function effectively by abrading the surface and lifting the grease from the surface.

Conventionally manufacturers and suppliers have been concerned about the risks and perceived undesirable properties of using fine, dusty perlite. Such material has been not only considered waste material but also a potential irritant after inhalation or disadvantageous because of its dusty nature and the consequent inconvenience of product being dispersed. According to the present invention, however, fine particles may be used and are effective. In contrast, absorption-based solutions, typically using larger particles, do not remove as much of the walked in grease or oil and are not as effective in that context.

From a second aspect the present invention provides a composition comprising expanded perlite as described above.

Products in accordance with the present invention may contain composition in sachets, bags or other containers, each of which is designed to have appropriate content to deal with commonly encountered scenarios. The container may carry or come with directions for using the product. The products may be single-use. For example, the composition may be packaged in one-use sachets. The containers may be air- and/or moisture/humidity-proof. The containers may be degradable, biodegradable, compostable, or otherwise disposable by environmentally advantageous ways.

FIGURE AND EXAMPLES

The invention will now be described in further non-limiting detail with reference to the following Examples and FIGURE in which:

FIG. 1 shows a Slip Test graph with example readings from a greasy/oily kitchen floor during operation and cleaning procedures (both comparative and in accordance with the present invention).

Example 1

One of the main disadvantages of current methods for cleaning greasy kitchen floors is the lack of relief from the risks of slips during busy periods. If one looks at kitchens dependent on heavy use of deep fat fryers for the production of a wide menu of fried foods, during intensive service periods it is virtually impossible to regain a safe floor, particularly around the deep fat fryer stations which are often eight or more units long. The small droplets of hot fat that fall from the frying baskets get walked into the floors, eventually across the whole kitchen and even into the restaurant area, thereby presenting a slip risk to both kitchen staff and customers.

Various tests are available for quantifying the slipperiness of floors. The UK Health and Safety Laboratory (HSL) commonly uses a test known as the Pendulum skid resistance test. This models the interaction between pedestrian heel and floor during normal pedestrian gait.

Other tests include roller coaster type tests: these use a ramp to bring a slider into contact with the floor. One of these is the SlipAlert test, provided by SlipAlert LLP (Hertfordshire, UK, www.slipalert.com).

The SlipAlert test uses a SlipAlert instrument which is a gravity-powered trolley which rolls down a ramp before making contact with a floor surface under examination. The SlipAlert test is chosen here because of its ease of use and speed, and compactness and portability of the apparatus. The distance travelled by the trolley indicates the slipperiness of the floor and can be correlated to coefficient of friction values or Pendulum test values.

With reference to FIG. 1, performance according to a SlipAlert test is shown. This test is recognised by the UK Health & Safety Executiive ("HSE") as a means of indicating slip risk on commercial floors. UK HSE equivalent Pendulum test values and coefficients of friction are shown. The top-left shaded box (dotted) indicates the green zone (low risk of slip). The middle shaded box (lightly hatched) indicates the amber or orange zone (medium risk). The bottom-right shaded box (heavily hatched) indicates the red zone (high risk). Results corresponding to three different scenarios are shown.

We have observed in a series of slip test data studies in operating kitchens that the floor surrounding a deep fat fryer station is often in the HSE Red Zone (high risk for slips), and during cleaning with a traditional method of mop, bucket, water and degreaser is only brought to within the later levels of the Orange Zone (considered by the HSE as an advisory level where actions need to be taken to remedy the situation) if allowed to dry without further droplets of oil affecting the area for 10 minutes prior to which the slip risk increases immediately after mopping into the higher and almost maximum end of the Red Zone. However, as soon as the Orange Zone reading is achieved more droplets of oil from the fat fryer baskets fall to the floor and increase the slip risk back to the Red Zone. At no point do these floors ever enter the safe Green Zone. In contrast, the present invention allows very effective results in the Green Zone.

The result shown (a value of less than 130, thereby within the green zone, i.e. denoting a low risk of slip) was obtained when using 500 ml of expanded perlite to strip walked in cooking oil from approximately 8 square meters of floor area immediately in the deep-fat fryer station area by pouring the powder at one end and brushing it down the affected floor area and back again once within a 1 minute period. The test was carried out in two different kitchens. In kitchen 1, SlipAlert readings of 124, 132 and 131 were obtained, giving an average of 129. In kitchen 2, SlipAlert readings of 129, 118 and 140 were obtained, again giving an average of 129, both average readings bringing the floor into the aforementioned safe Green Zone.

Example 2

In terms of man-hours spent, effectiveness and costs, the present invention is beneficial compared to traditional methods.

Traditional methods of cleaning a greasy kitchen floor can take on average twenty times longer than the invention. They can increase the slipperiness of the floor momentarily, but also rarely finish with a dry and safe floor during operating hours, thus proving ineffective.

The invention can reduce the clean time significantly to between $1/10^{th}$ and $1/20^{th}$ of the time required by normal methods and produces a relatively dry and safe floor, offering immediate improvement without the environmental and treatment costs associated with known methods (such as putting degreasing chemicals or surfactants in the waste water system and ultimately waterways and disposing of polymer and nylon mop heads and plastics in landfill sites).

The cost and material benefits of using the invention over traditional methods have been proven through testing carried out by the inventor. The primary cost saving is man-hours used in cleaning and degreasing floors. Using an average UK man-hour cost set at minimum wage of £7.64 (including employers' national insurance) the average current practice of cleaning of a greasy floor over an eight meter square floor area as described above takes 20 minutes and represents a cost of £2.54 and more often than not still leaves a slippery floor that would not be deemed as safe under tests as previously described. Whereas, if the same floor is cleaned using expanded perlite as detailed in accordance with the invention the floor is brought to a reasonably dry and safe status in between 1 and 2 minutes, representing a man-hour cost of between 12.7 p and 25.4 p. The materials cost differential is a complex matter which for accuracy would require assessment of cost of the use of water and detergents for each clean as well as a calculation of the fractional cost for each clean as a division of the maximum life span in terms of usage of polymer mop heads, any dry mop heads used and plastic buckets, as well as the cost of the environmental impact of these materials. The assessment of these material costs made by the inventor has led the inventor to estimate that the overall cost of the use of expanded perlite is cheaper than that of the materials used in conventional cleaning methods.

The invention claimed is:

1. A method for removing grease, oil or fat from a floor, comprising:

applying expanded perlite particles in dry form to the floor;

brushing the expanded perlite particles across an affected area to strip or scour grease, oil or fat from the floor, without applying water, wherein the expanded perlite particles remove grease, oil or fat from the floor; and removing the expanded perlite particles from the floor, wherein at least 50% by weight of the expanded perlite particles have a particle size of up to 700 microns.

2. The method of claim 1, wherein the expanded perlite particles are not applied to all of the affected area, but the expanded perlite particles are brushed across the entire affected area.

3. The method of claim 1, wherein 1 g to 50 g of the expanded perlite particles are applied per $m^2$ of affected area.

4. The method of claim 1, wherein at least 90% by weight of the expanded perlite particles have a particle size of less than 200 microns.

5. The method of claim 1, wherein the expanded perlite particles are not coated with any other material.

6. The method of claim 1, wherein the expanded perlite particles are part of a composition, and wherein at least 90% by weight of the composition comprises the expanded perlite particles.

7. A method for removing grease, oil or fat from a floor, comprising:

applying a composition in dry form to the floor;

brushing the composition across an affected area to strip or scour grease, oil or fat from the floor, without applying water, wherein the composition removes grease, oil or fat from the floor; and removing the composition from the floor, wherein at least 90% by weight of the composition is expanded perlite particles.

8. The method of claim 7, wherein the expanded perlite particles are not applied to all of the affected area, but the expanded perlite particles are brushed across the entire affected area.

9. The method of claim 7, wherein 1 g to 50 g of the expanded perlite particles are applied per $m^2$ of affected area.

10. The method of claim 7, wherein at least 90% by weight of the expanded perlite particles have a particle size of less than 200 microns.

11. The method of claim 7, wherein the expanded perlite particles are not coated with any other material.

* * * * *